(12) United States Patent
Takemura et al.

(10) Patent No.: US 6,671,973 B2
(45) Date of Patent: Jan. 6, 2004

(54) SURFACE TEXTURE MEASURING INSTRUMENT AND A METHOD OF ADJUSTING AN ATTITUDE OF A WORK FOR THE SAME

(75) Inventors: Fumihiro Takemura, Kanagawa (JP); Minoru Katayama, Hiroshima (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 10/142,204

(22) Filed: May 10, 2002

(65) Prior Publication Data

US 2002/0170196 A1 Nov. 21, 2002

(30) Foreign Application Priority Data

May 16, 2001 (JP) ........................................ 2001-147035

(51) Int. Cl.⁷ ................................................. G01B 3/14
(52) U.S. Cl. ............................. 33/551; 33/553; 33/549; 33/554; 33/555; 33/1 M; 33/502; 33/503; 73/104
(58) Field of Search ........................... 33/551, 553, 549, 33/503, 1 M, 502, 554, 555; 73/104

(56) References Cited

U.S. PATENT DOCUMENTS

| | | | | |
|---|---|---|---|---|
| 4,603,487 A | * | 8/1986 | Matsunata | 33/551 |
| 5,097,602 A | * | 3/1992 | Cross et al. | 33/551 |
| 6,256,898 B1 | * | 7/2001 | Trionfetti | 33/551 |
| 6,401,349 B1 | * | 6/2002 | Onyon | 33/551 |
| 6,442,857 B1 | * | 9/2002 | Atsuhiko et al. | 33/503 |
| 6,453,014 B1 | * | 9/2002 | Jacobson et al. | 379/26.01 |
| 6,453,730 B2 | * | 9/2002 | Takemura | 33/554 |
| 6,505,497 B1 | * | 1/2003 | Fujii | 33/502 |

FOREIGN PATENT DOCUMENTS

| | | |
|---|---|---|
| JP | A 8-122055 | 5/1996 |
| JP | A 2000-266534 | 9/2000 |

* cited by examiner

*Primary Examiner*—Diego Gutierrez
*Assistant Examiner*—Amanda Hoolahan
(74) *Attorney, Agent, or Firm*—Oliff & Berridge, PLC (57) ABSTRACT

A method of adjusting the relative attitude of a work in a surface texture measuring instrument for measuring the work having a feature region includes a measurement step of performing measurement of the feature region along an X-axis direction after positioning a detector in a Y-axis direction and the X-axis direction, a determination step of repeating the measurement which is performed while changing the position in the X-axis direction, and a step of adjusting the attitude of the work on the basis of the amount of relative attitude correction. Therefore, the direction of the feature region in the work is adjusted so as to be parallel to the Y axis.

13 Claims, 6 Drawing Sheets

SURFACE TEXTURE MEASURING INSTRUMENT AND A METHOD OF ADJUSTING AN ATTITUDE OF A WORK FOR THE SAME

BACKGROUND OF THE INVENTION

1. Field of the Invention

The present invention relates to a surface texture measuring instrument and a method of adjusting an attitude of a work in the surface texture measuring instrument for a measurement of a surface texture of the work such as a roughness, waviness, contour, and the like, and more particularly relates to a method of correcting the attitude thereof by adjusting a direction of a feature region thereof such as a V groove or an accurate groove and a measuring direction of a detector before the measurement.

2. Description of the Related Art

Conventionally, a form measuring instrument is known which performs roughness measurement, profile measurement, and the like of a work having a feature region such as a V groove or an accurate groove in a fixed direction. In this form measuring instrument, in a case where, for instance, the cross-sectional shape of a V groove or a pitch between grooves of a plurality of rows of V grooves in a work is measured, the work is mounted on a stage such that the direction in which the V groove extends is aligned with a Y-axis direction, a detector is driven in a direction perpendicular to the direction in which the V groove extends (X-axis direction), and stylus type measuring instrument is performed on the basis of an output of the detector.

With the above-described form measuring instrument, however, there has been no appropriate method for allowing the direction in which, for example, the V groove extends to be accurately aligned with the Y-axis direction. Therefore, in the related art, measurement has been carried out not in a direction accurately perpendicular to the direction in which the V groove or an accurate groove in the work extends but in a direction which is angularly offset though at a very small angle. Consequently, the cross-sectional shape of the groove or the pitch between grooves showed results which are different from actual ones. In fact, the measurement results exhibited values slightly smaller than those of a real groove shape or pitch between grooves.

To overcome these drawbacks, it has been practiced to conduct measurement while changing the attitude of the work by very small degrees so as to obtain results close to real values. However, since this method is very troublesome and makes it necessary to perform trial measurement a number of times, so that in the case of a probe-type measuring machine there have been cases where the work is damaged in a case where material of the work is soft.

SUMMARY OF THE INVENTION

It is an object of the invention to provide a surface texture measuring instrument capable of adjusting the relative attitude of a work mounted on a stage with respect to a coordinate system of the surface texture measuring instrument, capable of easily and precisely adjusting the mounted attitude with respect to the coordinate system even in the case of a work having a feature region in a fixed direction, and capable of reducing the time required for initial setup of measurement and of preventing the occurrence of damage to the work.

It is a further object of the invention to provide a method of adjusting the relative attitude of the work in the surface texture measuring instrument.

To attain the above object, the method of adjusting the relative attitude of the work in the surface texture measuring instrument in accordance with the invention has the following steps.

In first aspect of the invention, there is provided a method of adjusting the relative attitude of the work in the surface texture measuring instrument including: a stage for mounting thereon the work having a feature region along a fixed direction of a surface thereof such that the fixed direction becomes substantially aligned with a direction of a Y axis; a detector for detecting relative displacement of a direction of a Z axis substantially perpendicular to a surface of the work and perpendicular to the Y axis; a Y-axis moving unit for relatively moving the detector and the work in the Y-axis direction; an X-axis moving means for relatively moving the detector and the work in a direction of an X axis perpendicular to the Y axis and the Z axis, respectively, so as to effect measurement; and swivel means for relatively rotating the work and the detector in a X-Y plane including the X axis and the Y axis, so as to measure the surface quality of the work from the relative displacement outputted from the detector, the method characterized by comprising: a measurement step of effecting measurement by relatively positioning the detector with respect to the Y-axis direction and relatively moving the detector along the X-axis direction to obtain data on the feature region; a repeated determination step of repeating the measurement step more than once and storing n (n≧2) sets of data on the feature region; a relative-correction-amount calculating step of determining an amount of relative attitude correction of the work with respect to the detector by determining n feature points from n sets of data on the feature region and by determining a feature line connecting the feature points; and an adjustment step of adjusting the relative attitude of the work with respect to the detector on the basis of the amount of relative attitude correction.

According to second aspect of the invention, in the adjustment of the attitude of a work having a feature region such as a V groove or an accurate protrusion along a fixed direction on the surface, the direction of the feature region of the work mounted on a work-attitude adjusting table can be made accurately parallel to the Y axis. Subsequently, if the final measurement is effected in the X-axis direction, it is possible to accurately determine the cross-sectional shape of the V groove or the accurate protrusion. Furthermore, it is possible to accurately determine the distance between grooves in the case of the work having a plurality of grooves or the like.

Accordingly, since the accurate attitude adjustment of the work, which is essential to the precise measurement of the surface quality of the work, can be effected easily and speedily, no damage is caused to the work, and a reduction of the so-called initial setup time for measurement is made possible, thereby making it possible to improve the overall efficiency of the measurement operation and improve the measurement accuracy.

In accordance with second aspect of the invention, the method of adjusting the relative attitude of a work in a surface texture measuring instrument according to claim 1 is characterized by further comprising the step of displaying or printing out the amount of relative attitude correction calculated in the relative-correction-amount calculating step, wherein the attitude adjustment in the adjustment step is manual adjustment which is effected while referring to a result displayed or printed out.

According to the above-described invention, the inclination of the relative attitude of the work is displayed or printed out as an angle or a manipulated variable, and manual adjustment is performed by the operator in accordance with that value, so that accurate operation which is low cost and free of errors becomes possible. In particular, if a micrometer head is used at the operating portion of the attitude adjusting means, precise adjustment ca be made easily, so that more precise attitude adjustment becomes possible. In addition, if a micrometer head capable of digitally displaying the values of the manipulated variables is used, attitude adjustment which is more speedy, reliable, and precise becomes possible.

In accordance with a third aspect of the invention, the method of adjusting the relative attitude of a work in a surface texture measuring instrument according to claim 1 is characterized in that the attitude adjustment in the adjustment step is automatic adjustment based on the calculated amount of relative attitude correction.

According to the above-described invention, since the relative attitude adjustment of the work is automatically effected on the basis of the calculated amount of relative attitude correction, the attitude adjustment of the work as the initial setup of measurement can be performed at high speed, and the burden on the operator is alleviated. Hence, it is possible to improve the overall efficiency of the measurement operation and improve the reliability.

In accordance with a forth aspect of the invention, the method of adjusting the relative attitude of a work in a surface texture measuring instrument according to any one of claims 1 to 3 is characterized in that the adjustment step includes a swiveling adjustment step of adjusting the relative attitude of the work with respect to the detector by relatively rotating the work in the X-Y plane by swivel means.

According to the above-described invention, since the work undergoes relative rotation in the X-Y plane including the X axis and the Y axis to permit its attitude, the direction of the feature region such as the direction of the bottom of a V groove can be easily adjusted parallel to the direction of the Y axis perpendicular to the X axis which is the measuring direction. In addition, the amount of correction in the X-Y plane can be calculated by a trigonometric function and a algebraic calculation, and it is unnecessary to use a special operating processor, so that the calculation can be performed at low cost, accurately, and at high speed.

In accordance with a fifth aspect of the invention, the method of adjusting the relative attitude of a work in a surface texture measuring instrument according to any one of claims 1 to 4 is characterized in that the surface texture measuring instrument further includes tilting means for relatively rotating the work and the detector in a Y-Z plane including the Y axis and the Z axis, and the adjustment step further includes a tilting adjustment step of adjusting the relative attitude of the work with respect to the detector by relatively rotating the work in the Y-Z plane by the tilting means.

According to the above-described invention, since the work undergoes relative rotation in the Y-Z plane including the Y axis and the Z axis to permit its attitude, the direction of the feature region such as the direction of the bottom of a V groove can be easily adjusted parallel to the direction of the Y axis perpendicular to the X axis which is the measuring direction. In addition, the amount of correction in the Y-Z plane can be calculated by a trigonometric function and a algebraic calculation, and it is unnecessary to use a special operating processor, so that the calculation can be performed at low cost, accurately, and at high speed.

In accordance with a sixth aspect of the invention, the method of adjusting the relative attitude of a work in a surface texture measuring instrument according to any one of claims 1 to 5 is characterized in that the relative-correction-amount calculating step further includes a step of determining the n shape feature points from the n sets of data on the feature region and setting coordinate values thereof as coordinate values of the n feature points.

According to the above-described invention, instead of determining a feature point directly from the measurement data on the feature region including noise and the like, the best fit of a design shape corresponding to the shape of the feature region is performed to eliminate errors ascribable to noise and an attitude error, thereby making it possible accurately estimate the shape of the feature region in the measurement portion. Furthermore, if the feature region is accurate, its center position can be used as a feature point, and if the feature region is a combination of straight lines, a point of intersection of straight lines determined by least square method can be used as a feature point. Thus it is possible to use ideal feature points in correspondence with the shape of a special region, so that it becomes possible to perform highly accurate and reliable attitude calculation.

In accordance with a seventh aspect of the invention, the method of adjusting the relative attitude of a work in a surface texture measuring instrument according to any one of claims 1 to 6 is characterized in that in the relative-correction-amount calculating step a least-square straight line determined from the coordinate values of the n feature points is set as the feature line.

According to the above-described invention, since the connection of a plurality of feature points is replaced by a least-square straight line which is set as a feature line, it becomes possible to minimize the error ascribable to noise and a partial processing error in the work. Consequently, it becomes possible to perform highly precise and reliable attitude calculation, and the attitude of the work can be determined accurately, so that the attitude adjustment accuracy improves overall.

DESCRIPTION OF THE PREFERRED EMBODIMENTS

Referring now to the drawings, a description will be given of the embodiments of the invention.

Figure 1:
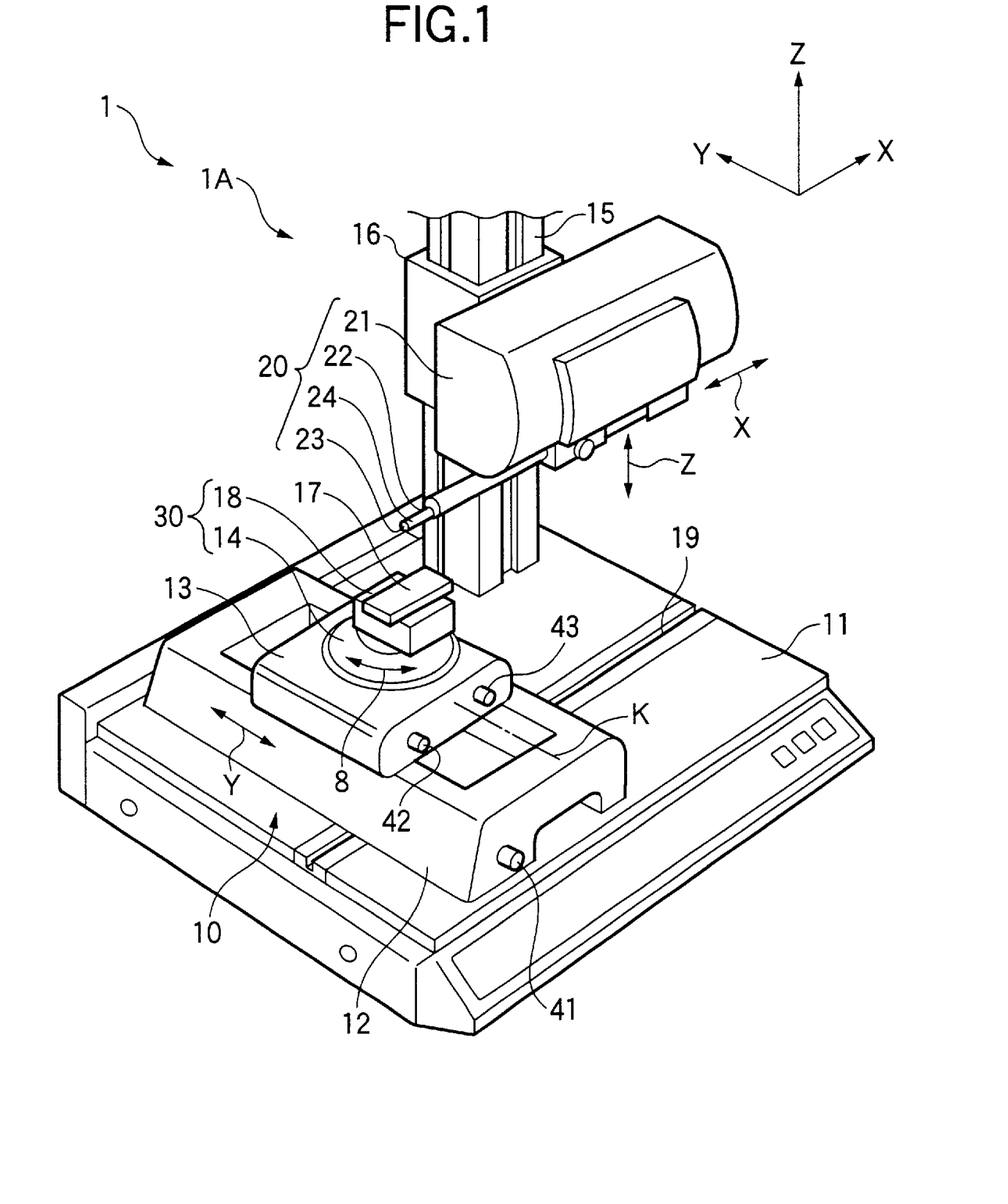
FIG. 1 is a perspective view illustrating a surface texture measuring instrument in accordance with a first embodiment of the invention.

As shown in FIG. 1, a measuring instrument body 1A is a measuring unit of a surface texture measuring instrument 1 in accordance with a first embodiment of the invention. The measuring instrument body 1A has a base 11.

A work-attitude adjusting table 10 is provided on the base 11. This work-attitude adjusting table 10 includes a Y-axis table 12, a rotary table 13, and a stage 18. The Y-axis table 12 is provided movably in a Y-axis direction (a back-and-forth direction perpendicular to an X-axis direction, i.e., a measuring direction within a horizontal plane). The rotary table 13 has a swivel table 14 provided on the Y-axis table 12 in such a manner as to be capable of swiveling in a θ-direction (within a X-Y plane). The stage 18 is provided on the swivel table 14 movably in a Z-axis direction (a direction perpendicular to the Y-axis direction within a vertical plane). In addition, a column 15 is provided uprightly on a rear portion of the base 11 at a right-hand position thereof in the FIG. 1. A Z-axis slider 16 is provided on this column 15 liftably in the Z-axis direction. A measuring mechanism 20 is provided on this Z-axis slider 16 movably in the X-axis direction (the measuring direction).

A position of the Y-axis table 12 is adjustable by a manual operation of an unillustrated moving member. The position is moved between the Y-axis table 12 and the base 11 by moving member which moved along a groove 19 formed in the base 11.

A micrometer head (hereafter referred to as a micrometer head) 41 for a Y axis includes a Y-axis moving unit. The micrometer head 41 is provided on a side surface of the Y-axis table 12 on this side of FIG. 1. As an operator operates a knob of the micrometer head 41 by manually turning it, the movement of the Y-axis table 12 in the Y-axis direction is performed. Namely, the micrometer head 41 is a manual driving unit for moving the Y-axis table 12.

A micrometer head 42 for swivel including a rotation adjusting unit (swivel adjusting unit) and a micrometer head 43 for inclination including an inclination adjusting unit (tilt unit) are provided on a side surface of the rotary table 13 on this side of FIG. 1.

Of these micrometer heads, the micrometer head 42 for swivel is capable of rotating in the X-Y plane a work 17 mounted on the swivel table 14, when the operator operates a knob of the micrometer head 42 by manually turning it, to thereby adjust orientation of the work 17 with respect to the X axis. Further, the micrometer head 43 for inclination is capable of adjusting the inclination of the work 17 with respect to the Y axis in a Y-Z plane, when the operator operates a knob of the micrometer head 42 by manually turning it.

These micrometer heads 41, 42, and 43 for a Y axis, swivel, and inclination are respectively provided with unillustrated display units 41A, 42A, and 43A to digitally display movement amount or adjustment amounts (amounts of correction), i.e., manipulated variables. For this reason, when the respective amounts of the work or the adjustment amounts of the work's attitude are given, it is possible to effect the movement operation or attitude adjustment with ease and precision by operating the knob portions of the heads 41 and the like according to the digitally indicated values.

It should be noted that minimum scale values of the micrometer heads 41, 42, and 43 are set to about 0.001 mm.

In addition, the movement of the Y-axis table 12 in the Y-axis direction by the micrometer head 41 for the Y-axis is possible within the range of, for example, ±12.5 mm. Further, the rotation of the swivel table 14 within the X-Y plane by the micrometer head 42 for swivel in an adjusting unit 30 is possible within the range of, for example, ±2°, while the inclination of the stage 18 within the Y-Z plane by the micrometer head 43 for inclination is possible within the range of, for example, ±1.5°. Accordingly, the correction of the attitude of the work can be effected extremely precisely.

As shown in the drawing, the stage 18 is provided on the swivel table 14. The work 17 is mounted directly thereon, or mounted by means of a jig such as a V-block. These members include the adjustment means 30 and also serve as a work mounting means. Furthermore, the adjusting means (work mounting means) 30 as well as the Y-axis table 12 and the rotary table 13 include the work-attitude adjusting table 10.

A measuring mechanism 20 includes an X-axis drive unit 21, a measuring arm 22, and a contact-type detector 24. The X-axis drive unit 21 is provided on a Z-axis slider 16 movably in the X-axis direction. The measuring arm 22 is attached to the X-axis drive unit 21 movably in the X-axis direction. The contact-type detector 24 is attached to an end portion of the measuring arm 22 and having a stylus 23 (contact-element) at the tip thereof. By moving the measuring arm 22 in the X-axis direction while maintaining a state in which the stylus 23 is kept in contact with the work 17 mounted on the swivel table 14, the measuring mechanism 20 displaces the stylus 23 vertically (Z-axis direction) according to irregularities of the surface contour of the work 17. The measuring mechanism 20 detects the amount of oscillation of the stylus 23 at this time, thereby making it possible to measure the contour, the surface roughness, and the like of the work 17 on the basis of the amount of oscillation.

Figure 2:
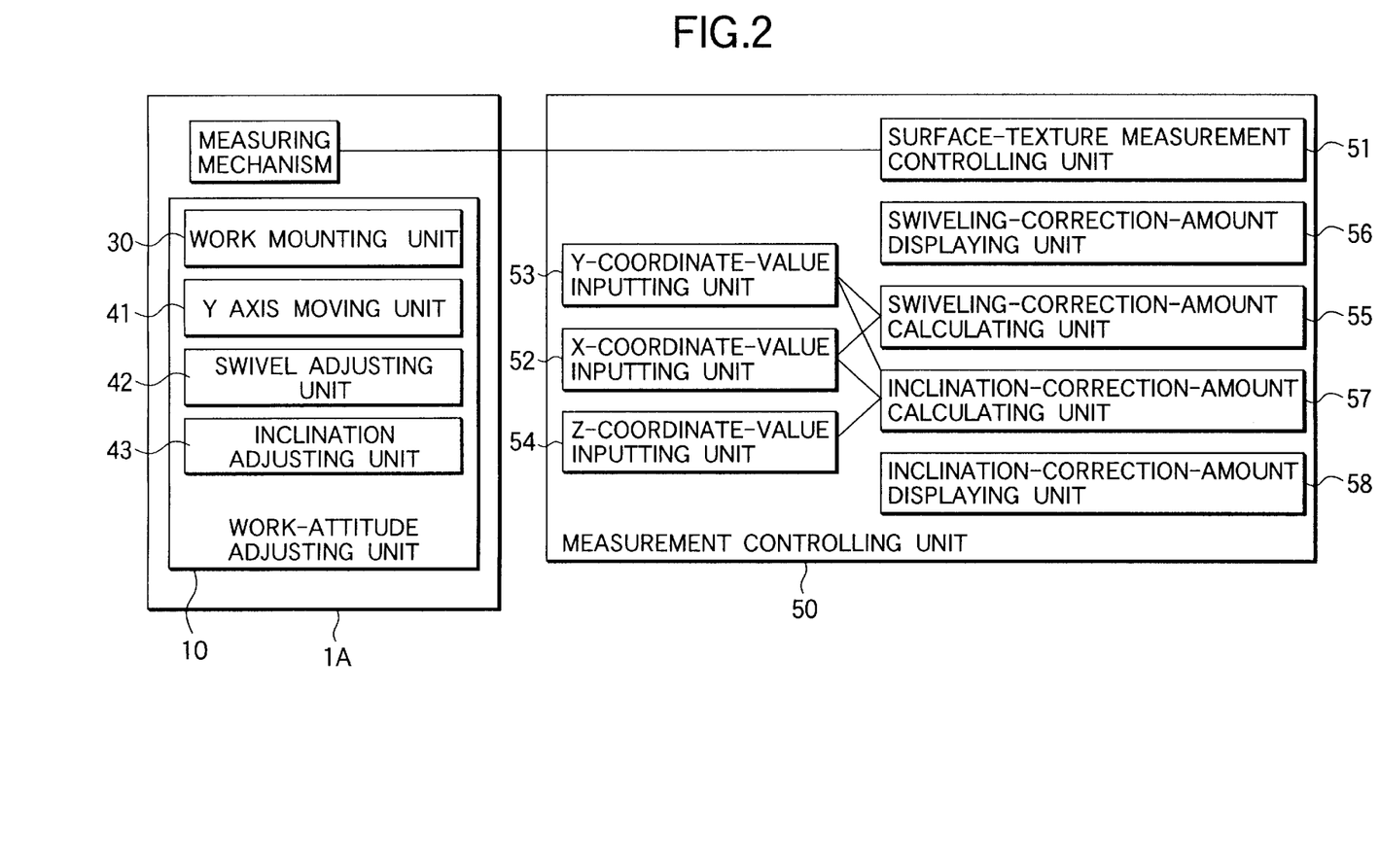
FIG. 2 is a block diagram illustrating the surface texture measuring instrument in accordance with the embodiment.

As shown in FIG. 2, the surface texture measuring instrument 1 includes the above-described measuring instrument body 1A and a measurement controlling means 50 for controlling the measuring instrument body 1A to adjust the attitude of the work 17. The measurement controlling means 50 includes, in addition to an ordinary surface-quality measurement controlling means 51, the X-coordinate-value inputting unit 52, a Y-coordinate-value inputting unit 53, a Z-coordinate-value inputting unit 54, a swivel-correction-amount calculating means 55, swivel-correction-amount displaying means 56, inclination-correction-amount calculating means 57, and inclination-correction-amount displaying means 58. The X-coordinate-value inputting unit 52 inputs an X-coordinate value obtained at the time of measurement of the work 17 for attitude adjustment. The Y-coordinate-value inputting unit 53 inputs a Y-coordinate value. The Z-coordinate-value inputting unit 54 inputs a Z-coordinate value. The swivel-correction-amount calculating means 55 calculates a swivel inclination amount from the X- and Y-coordinate values and its correction amount. The swivel-correction-amount displaying means 56 displays or prints out the calculated swivel correction amount. The inclination-correction-amount calculating means 57 calculates an inclination amount and its inclination correction amount from the X-, Y-, and Z-coordinate values. The inclination-correction-amount displaying means 58 displays or prints the correction amount. For instance, the measurement controlling means 50 includes a microcomputer or a data processor, as well as a CPU and various memories incorporated therein, an external storage device, programs stored in them, a keyboard, a mouse, a display, a printer, and so on.

Figure 3:
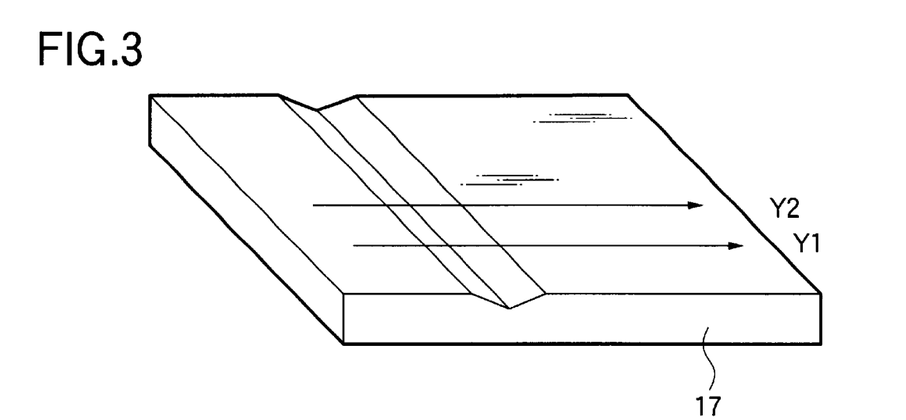
FIG. 3 is a diagram illustrating the basic principle of attitude adjustment using the surface texture measuring instrument in accordance with the embodiment.

Next, referring to schematic diagrams shown in FIGS. 3 to 6 and a flowchart shown in FIG. 7, a description will be given of an operating procedure for adjusting the attitude of a V groove work 17 by way of preparation for measuring the shape of a V groove portion of the V groove work 17 by using the work-attitude adjusting table 10. In this embodiment, as shown in FIG. 3, a V groove region of the V groove work 17 is measured at a plurality of locations in orthogonal directions with respect to the V groove. Coordinate values of the respective V groove bottom portions (form feature points) are determined, a least-square straight line is calculated on the basis of these form feature points. Further, an inclination of the least-square straight line is regarded as the attitude of the V groove work 17. And then the inclination is corrected to agree with a reference attitude to thereby make an adjustment of the attitude of the V groove work 17.

Figure 4A:
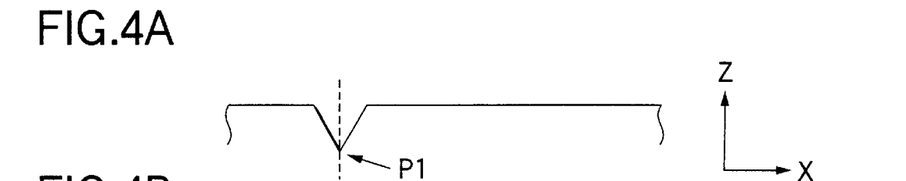
FIGS. 4A and 4B are diagram illustrating the basic principle of attitude adjustment using the surface texture measuring instrument in accordance with the embodiment.
Figure 7:
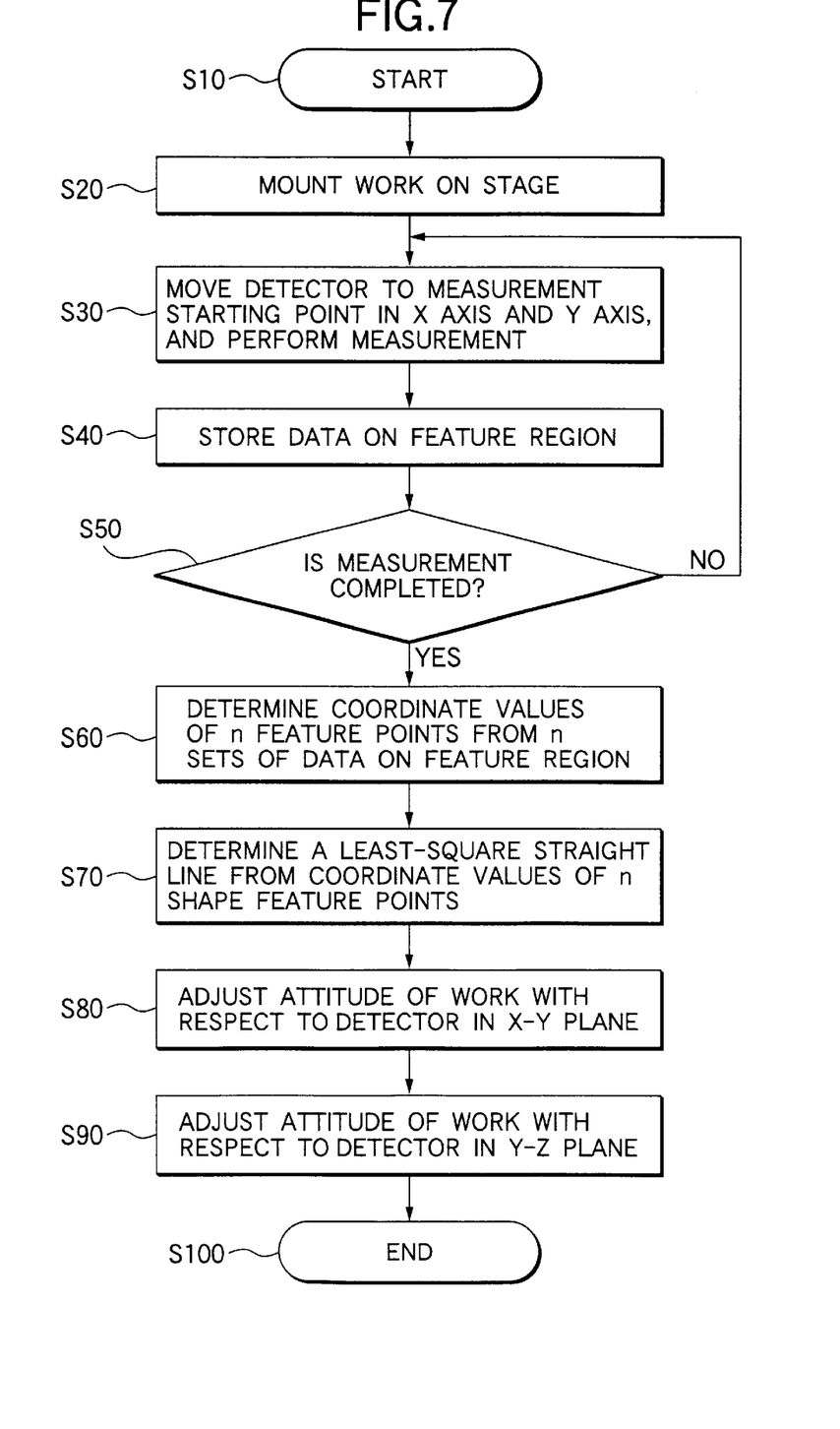
FIG. 7 is a flowchart illustrating the procedure of attitude adjustment using the surface texture measuring instrument in accordance with the embodiment.

As shown in FIG. 7, the adjustment of the attitude of the V groove work 17 is started in Step 10. In Step 20, the V groove work 17 is first mounted on the stage 18 such that the direction of the V groove (the direction of the bottom of the V groove in the V groove work 17 from the front surface toward the rear surface in FIG. 3) is substantially aligned with the Y axis. In Step 30, the operator manually moves the detector 24 to a starting point (measurement starting point) of arrow Y1 shown in FIG. 3 in the X-axis direction and the Y-axis direction, and after the stylus 23 is thereby positioned on the surface of the V groove work 17, a measurement is performed in the direction of arrow Y1. The measurement results are shown in FIG. 4A.

Figure 4B:
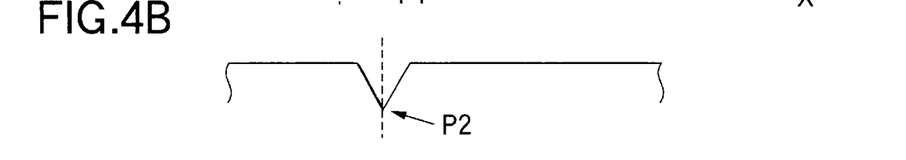

In Step 40, a data on the V groove is stored in a memory. In a case where a predetermined number of the measurement has not been reached, the operation returns to Step 30. At this time, the operator manually turns the knob portion of the micrometer head 41 for the Y axis to move the Y-axis table 12 back and forth. Then, the operator manually moves the detector 24 to the starting point (measurement starting point) of arrow Y2 shown in FIG. 3 in the X-axis direction and the Y-axis direction. After the stylus 23 is positioned on the surface of the work 17, the measurement is performed in the direction of arrow Y2. The measurement results are shown in FIG. 4B. In a case where the direction of the V groove bottom is not accurately aligned with the Y axis, the position of the groove bottom appears at a different position in the X-axis direction, as shown in FIG. 4B. The measurement is thus performed consecutively at different positions in the Y-axis direction. When the predetermined number of measurement (n≧2) is reached, the operation proceeds to Step 60.

In Step 60, coordinate values of n feature points are determined from n sets of shape data on the V groove. More specifically, a least-square straight line is determined by using data of a left slope portion in the first set of shape data on the V groove, and a least-square straight line is then determined by using data of a right slope portion. Next, a point of intersection of these two least-square straight lines are determined, and its coordinate values (X, Y, Z) are set as a first shape feature point (point P1 in FIG. 4). Similarly, coordinate values of second to n-th shape feature points are determined from the second to n-th sets of shape data on the V groove (e.g., point P2 in FIG. 4).

Figure 5:
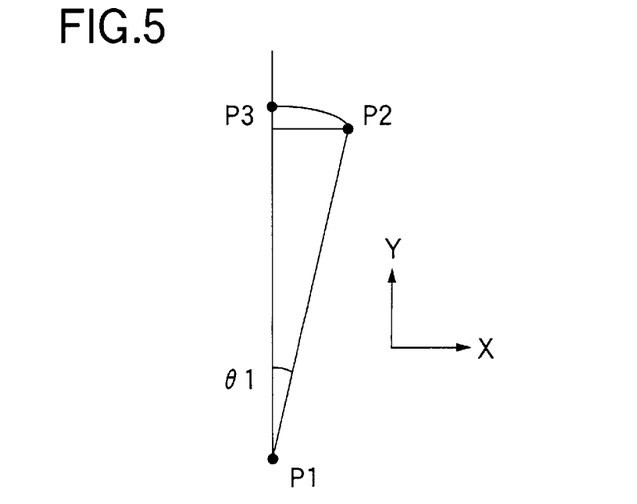
FIG. 5 is a diagram illustrating the procedure of attitude adjustment using the surface texture measuring instrument in accordance with the embodiment.

Next, in Step 70, a least-square straight line is determined from the coordinate values of n feature points (shape feature points), and a segment of the least-square straight line from a position corresponding to the first feature point to a position corresponding to the n-th feature point is set as a feature line. In the case of n=2, a segment connecting two feature points is set as the feature line. The feature line thus determined is shown by a straight line P1P2 shown in FIG. 5. FIG. 5 shows a state in which the straight line P1P2 is projected onto a X-Y plane. Particularly in this case, the point P1 is positioned on the Y axis. In addition, since the point P2 has a certain height (or lowness) with respect to the plane of the drawing since its value in the Z-axis direction passing through the plane of the drawing is not zero. An angle θ1 in FIG. 5 shows an inclination of the feature line with respect to the Y axis. Here, if it is assumed that the coordinate values of the point P1 are Xs, Ys, and Zs, and that the coordinate values of the point P2 are Xe, Ye, and Ze, the angle θ1 satisfies the following relational expression:

$$\text{Tan}\theta 1=(Xe-Xs)/(Ye-Ys) \quad (1)$$

It should be noted that point P3 in FIG. 5 shows the position of the point P2 in a case where the point P2 has been rotated about the point P1, and the straight line P1P2 has been aligned with the Y axis. Accordingly, the lengths of the straight line P1P2 and the straight line P1P3 are the same.

Figure 6:
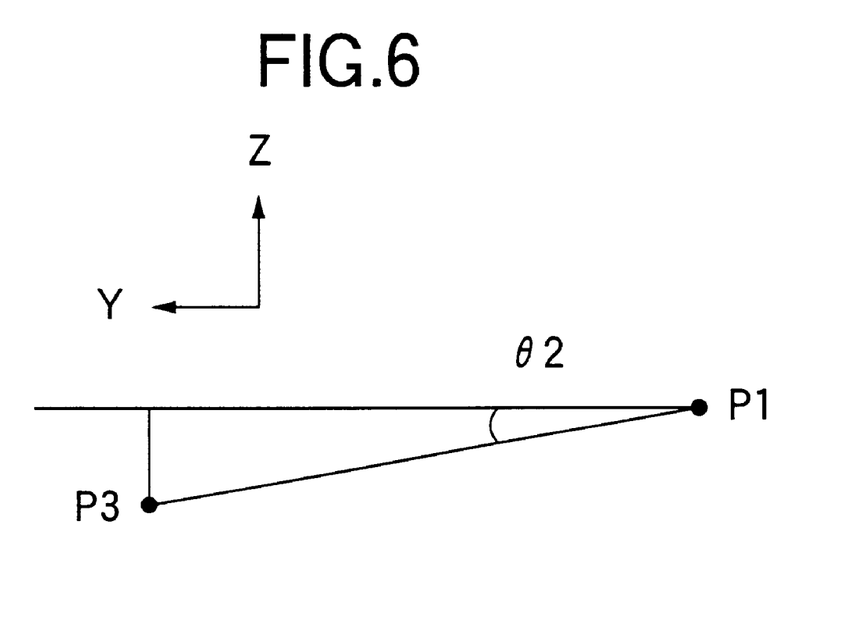
FIG. 6 is a diagram illustrating the procedure of attitude adjustment using the surface texture measuring instrument in accordance with the embodiment.

FIG. 6 shows the straight line P1P3 in FIG. 5 on the Y-Z plane. As can be seen from this drawing, the straight line P1P3 has an inclination of θ2 with respect to the Y axis. The length of a perpendicular line drawn from P3 to the Y axis is shown by Ze−Zs. If it is assumed that the length from the point P1 to the position of a point of intersection between this perpendicular line and the Y axis is YL, the angle θ2 satisfies the following relational expression:

$$\text{Tan}\theta 2=(Ze-Zs)/YL \quad (2)$$

Here, YL can be easily determined if the square of $Y_2$−Ys and the square of Xe−Xs are added and a square root is obtained. Inclinations (θ1 and θ2) of the feature line are determined in accordance with Formula 1 and 2 above, these inclinations are converted to manipulate variables (correction amounts) of the swivel adjusting unit 42 (micrometer head for swivel) and the inclination adjusting unit 43 (micrometer head for inclination), which are displayed on a display screen or printed out by a printer. Next, in Step 80, the V groove work 17 is rotated by operating the micrometer head 42 for swivel while referring to the manipulated variable (correction amount) of the swivel adjusting unit 42 (micrometer head for swiveling) displayed or printed out, to thereby adjust the attitude of the V groove work 17 within the X-Y plane.

In Step 90, the micrometer head 43 for inclination is operated while referring to the manipulated variable (correction amount) of the inclination adjusting unit 43 (micrometer head for inclination) displayed or printed out, thereby adjusting the attitude of the work within the Y-Z plane. In Step 100, the series of work attitude adjustment is completed. As a result of this processing and operation, the direction of the V groove bottom of the work becomes parallel to the Y axis, so that if measurement is subsequently performed in the X-axis direction, it is possible to obtain an accurate cross-sectional shape of the V groove.

Although a description has been given of the invention by citing a preferred embodiment, the invention is not limited to the embodiment, and various modifications are possible without departing from the gist of the invention.

In the above-described embodiment a description has been given of the adjustment of the attitude of the work 17 by limiting it to the form of manually operating the micrometer heads while referring to the inclinations of the work (inclinations of the feature line) displayed or printed out. However, by providing pulse motors, for instance, instead of the micrometer heads, if the amounts of pulses for motor operation are calculated from the angles of inclination obtained from Formulae 1 and 2, and the pulse motors are driven through pulse motor amplifiers, it is possible to automate the attitude adjustment. Therefore, it is possible to speed up the work attitude adjustment as the initial setup of measurement, thereby improving the overall efficiency of measurement. It should be noted that, in this case, the micrometer head 41 for the Y axis can be similarly substituted by a motor to effect automation.

Figure 8:
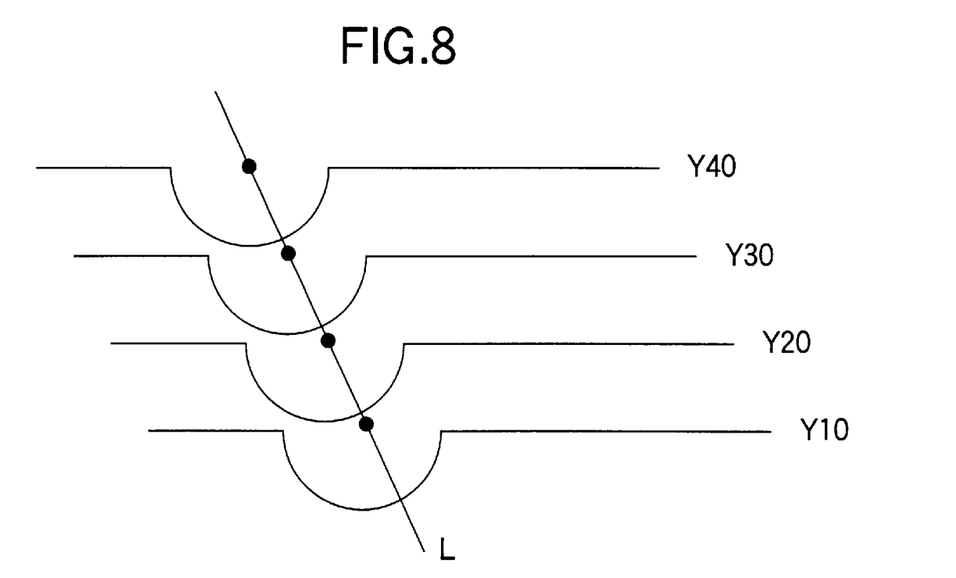
FIG. 8 is a diagram illustrating the basic principle of attitude adjustment in accordance with another embodiment of the invention.
Figure 9:
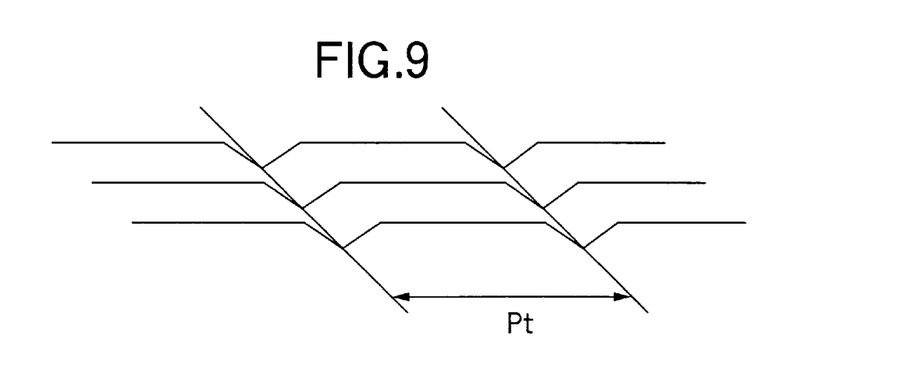
FIG. 9 is a diagram illustrating the basic principle of attitude adjustment in accordance with the other embodiment of the invention.

In addition, although in this embodiment a description has been given of only the measurement of the cross-sectional shape of a V groove in the work, the invention is not limited to the V groove and is applicable to an accurate groove as well. In this case, the position of the center of a circular arc calculated from data on an accurate region is preferable as a shape feature point. For example, FIG. 8 shows an example in which measure is performed at four locations by changing the position on in the Y-axis direction on the work having an accurate groove, and filled circles in the drawing show the respective centers of the circular arcs. In this case, a least-square straight line (straight line L in FIG. 8) is determined from the coordinates of the centers of the four circular arcs and is set as a feature line, and the inclination of this feature line is regarded as the attitude (inclination) of the work so as to perform attitude adjustment. Furthermore, in a case where the distance between grooves (pitch) is to be determined in a work having a plurality of rows of V grooves or accurate grooves, the distance between their feature lines may be calculated and may be set as the distance between grooves. In this case, if final adjustment is made after the attitude adjustment is performed by focusing upon one feature line, it is possible to determine the distance between grooves more accurately (see FIG. 9). Furthermore, if the difference between the inclinations of the respective feature lines is determined, it is possible to determine parallelism between the grooves.

In this embodiment, only a groove portion such as the V groove or the accurate groove has been illustrated as the feature region of the work, but the feature region is be limited to one having a hollow shape but may be one having a protruding shape. For instance, the work may be one including an accurate protruding region as the feature region. Furthermore, if a work having a cylindrical shape is mounted substantially in alignment with the Y axis, and the attitude adjustment in accordance with the invention is performed, the axis of the cylinder can be made parallel to the Y axis precisely, the final measurement of the X axis after this attitude adjustment becomes the measurement of the cross-sectional shape of the cylinder accurately. Therefore, it becomes possible to determine the radius or the center position of the cylinder accurately.

As described above, according to the method of adjusting the relative attitude of the work in a surface texture measuring instrument in accordance with the invention, in the attitude adjustment, the direction of the feature region of the work mounted on a work-attitude adjusting table can be made accurately parallel to the Y axis. Subsequently, if the final measurement is performed in the X-axis direction, it is possible to accurately determine the cross-sectional shape of the V groove or an accurate groove. Furthermore, it is possible to accurately determine the distance between grooves in the case of the work having a plurality of grooves or the like. Accordingly, since the accurate attitude adjustment of the work, which is essential to the precise measurement of the surface quality of the work, can be effected easily and speedily, a reduction of the so-called initial setup time for measurement is made possible, thereby making it possible to improve the overall efficiency of the measurement operation and improve the measurement accuracy.

What is claimed is:

1. A method of adjusting in a surface texture measuring instrument a relative attitude of a work having a feature region along a fixed direction of a surface of the work, the method comprising the steps of:
    a) mounting the work on a stage in such a manner that the fixed direction becomes substantially aligned with a Y axis;
    b) moving the detector along a X axis in order to obtain a data of the feature region after deciding a position of the detector along the direction of the Y axis;
    c) storing n (n≧2) sets of data on the feature region of the work by repeating more than once a step b);
    d) calculating an amount of a relative attitude correction of the work with respect to the detector from determining n shape feature points from n sets of data on the feature region of the work and from determining a feature line connecting the n shape feature points; and
    e) adjusting the relative attitude of the work with respect to the detector on the basis of the amount of the relative attitude correction of the work.

2. The method of adjusting the relative attitude of the work according to claim 1, the method further comprising the steps of:
    f) displaying or printing out the amount of the relative attitude correction of the work; and
    g) adjusting manually the relative attitude of the work with respect to the detector on the basis of the amount of the relative attitude correction of the work, while referring to a result of displaying or printing out the amount of the relative attitude correction of the work.

3. The method of adjusting the relative attitude of the work according to claim 1, the method further comprising the step of:
    h) adjusting automatically the relative attitude of the work with respect to the detector on the basis of the amount of the relative attitude correction of the work.

4. The method of adjusting the relative attitude of the work according to claim 1, the method further comprising the step of:
    i) adjusting the relative attitude of the work with respect to the detector on the basis of the amount of the relative attitude correction of the work by relatively rotating the work with respect to the detector in a X-Y plane.

5. The method of adjusting the relative attitude of the work according to claim 1, the method further comprising the step of:
    j) adjusting the relative attitude of the work with respect to the detector on the basis of the amount of the relative attitude correction of the work by relatively rotating the work with respect to the detector in the Y-Z plane including a Y axis and a Z axis.

6. The method of adjusting the relative attitude of the work according to claim 1, the method further comprising the steps of:
    k) determining the n shape feature points from the n sets of data on the feature region of the work; and
    l) setting coordinate values of the n shape feature points as coordinate values of the n feature points.

7. The method of adjusting the relative attitude of the work according to claim 1, the method further comprising the step of:
    m) determining a least-square straight line from the coordinate values of the n feature points is set as the feature line.

8. A surface texture measuring instrument of adjusting a surface of a work having a feature region along a fixed direction of the surface of the work, the instrument comprising:

a stage for mounting thereon the work having the feature region along the fixed direction of the surface thereof in such a manner that the fixed direction of the surface of the work becomes substantially aligned with a Y axis;

a detector for detecting a relative displacement of the work with respect to the detector in a Z axis substantially perpendicular to a surface of the work and perpendicular to the Y axis;

a Y-axis moving unit for relatively moving the detector and the work in the Y axis direction;

a X-axis moving unit for relatively moving the detector and the work in a X axis perpendicular to the Y axis and the Z axis, respectively in order to obtain a data of the feature region of the work;

a storage unit for storing n (n≧2) sets of the data of the feature region of the work obtained by the detector moved by the X-axis moving unit;

a data processing unit for calculating an amount of a relative attitude correction of the work with respect to the detector from determining n shape feature points from n sets of data on the feature region of the work and from determining a feature line connecting the n shape feature points; and a swivel unit for relatively rotating in a X-Y plane including the X axis and the Y axis the work and the detector on a basis of the amount of the relative attitude correction of the work.

9. The surface texture measuring instrument according to claim 8, further comprising:

a displaying unit for displaying or printing out the amount of the relative attitude correction of the work, wherein the relative attitude of the work with respect to the detector is manually adjusted by the swivel unit, while referring to a result of displaying or printing out the amount of the relative attitude correction of the work by the displaying unit.

10. The surface texture measuring instrument according to claim 8, wherein the swivel unit is an automatic adjusting unit by a motor.

11. The surface texture measuring instrument according to claim 8, further comprising:

a tilt unit for adjusting the relative attitude of the work with respect to the detector on the basis of the amount of the relative attitude correction of the work by relatively rotating the work with respect to the detector in a Y-Z plane including the Y axis and the Z axis.

12. The surface texture measuring instrument according to claim 8, wherein n shape feature points are determined by the n (n≧2) sets of the data of the feature region of the work, coordinate values of the n shape feature points is set as coordinate values of n feature points.

13. The surface texture measuring instrument according to claim 8, wherein a least-square straight line determined from the coordinate values of the n feature points is set as the feature line.

* * * * *